US 6,742,427 B2

(12) United States Patent
Buta (10) Patent No.: US 6,742,427 B2
(45) Date of Patent: Jun. 1, 2004

(54) HELICAL ROTARY DRUM SHEARS (76) Inventor: John R. Buta, 663 S. Lincoln Ave., Salem, OH (US) 44460

(*) Notice: Subject to any disclaimer, the term of this patent is extended or adjusted under 35 U.S.C. 154(b) by 0 days.

(21) Appl. No.: 10/318,897

(22) Filed: Dec. 13, 2002

(65) Prior Publication Data

US 2003/0121381 A1 Jul. 3, 2003

Related U.S. Application Data (60) Provisional application No. 60/341,126, filed on Dec. 13, 2001.

(51) Int. Cl.$^7$ .............................. B23D 25/12; B26D 1/62
(52) U.S. Cl. .............................. 83/338; 83/342; 83/672
(58) Field of Search ........................... 83/342, 338, 672

(56) References Cited

U.S. PATENT DOCUMENTS

| 3,561,311 | A | | 2/1971 | Nowak et al. | |
|---|---|---|---|---|---|
| 3,570,348 | A | | 3/1971 | Hallden | |
| 3,769,867 | A | | 11/1973 | Schilling | |
| 4,244,250 | A | | 1/1981 | Rudszinat | |
| 4,361,064 | A | | 11/1982 | Sasaki | |
| 4,630,514 | A | | 12/1986 | Ohmori et al. | |
| 4,692,109 | A | | 9/1987 | Hayashi et al. | |
| 4,858,506 | A | | 8/1989 | Buta | |
| 4,949,606 | A | | 8/1990 | Pfeiffer | |
| 5,000,069 | A | | 3/1991 | Knobel | |
| 5,268,723 | A | * | 12/1993 | Kikuchi | 399/101 |
| 5,386,753 | A | | 2/1995 | Baron et al. | |
| 5,436,423 | A | | 7/1995 | Welty | |
| 5,513,709 | A | * | 5/1996 | Fisher | 173/205 |
| 5,526,726 | A | | 6/1996 | Shore et al. | |
| 5,630,346 | A | * | 5/1997 | Strait | 82/113 |
| 5,642,969 | A | * | 7/1997 | Strait | 408/124 |
| 5,720,210 | A | | 2/1998 | Okahashi | |
| 5,836,228 | A | | 11/1998 | Guthrie et al. | |
| 5,857,392 | A | | 1/1999 | Parkander | |
| 6,032,558 | A | | 3/2000 | Michler | |
| 6,065,382 | A | | 5/2000 | Titz et al. | |
| 6,142,048 | A | | 11/2000 | Bradatsch et al. | |
| 6,155,151 | A | | 12/2000 | Reichert | |
| 6,158,316 | A | | 12/2000 | Ichikawa et al. | |
| 6,161,458 | A | | 12/2000 | Spatafora | |
| 6,205,898 | B1 | | 3/2001 | Surina | |
| 6,272,959 | B1 | | 8/2001 | Drigani et al. | |
| 2001/0001376 | A1 | | 5/2001 | Kneppe et al. | |
| 2001/0020407 | A1 | | 9/2001 | Grafe et al. | |

FOREIGN PATENT DOCUMENTS

JP          55-5275        1/1980

OTHER PUBLICATIONS

PCT International Search Report for International Application No. PCT/US02/39762 (Mar. 19, 2003).
PCT International Written Opinion for International Application No. PCT/US02/39762 (Aug. 22, 2003).

* cited by examiner

Primary Examiner—Allan N. Shoap
Assistant Examiner—John Windmuller
(74) Attorney, Agent, or Firm—Hahn Loeser & Parks, LLP; Robert J. Clark (57) ABSTRACT The present invention relates to a novel helical drum shear which is operable to cut a strip of material which moving at a first velocity. The cut is formed along a substantially straight line at a specific angle. The specific angle may be at an angle perpendicular to the feed direction thereby producing a squared cut. The helical drum shear comprises a means for cutting the material wherein the cutting means moves at a second velocity which is at a predetermined angle from the first velocity. The apparatus further comprises a means for moving the cutting means at a third velocity such that the combination of the second velocity and the third velocity is equivalent to the first velocity and the material is helically sheared along a substantially straight line oblique to the first velocity.

16 Claims, 7 Drawing Sheets

LAW OF SINES $$\frac{\text{SIN}(90-\Phi'-\alpha)}{V_F} = \frac{\text{SIN}(90+\alpha)}{V_D}$$

THEREFORE $V_D = V_F \cdot \dfrac{\text{SIN}(90+\alpha)}{\text{SIN}(90-\Phi'-\alpha)}$ $$\frac{\text{SIN}(90-\Phi'-\alpha)}{V_F} = \frac{\text{SIN}(\Phi')}{V_S}$$

THEREFORE $V_S = V_F \cdot \dfrac{\text{SIN}(\Phi')}{\text{SIN}(90-\Phi'-\alpha)}$

Figure 10C

HELICAL ROTARY DRUM SHEARS

This application claims the benefit of U.S. Provisional Application No. 60/341,126 filed Dec. 13, 2001, hereby incorporated by reference. The present invention relates to helical type drum shears and in particular to a new helical drum shear which is operable to cut a strip of material along a substantially straight line at a specific angle to the feed direction including a perpendicular angle producing a squared cut.

TECHNICAL FIELD

BACKGROUND OF THE INVENTION

In the typical manufacture of steel plate stock, a strip of steel material is unwound from a coil where it is flattened and fed through a shearing machine and cut to the desired length or the desired location. There are a variety of shears used by manufacturers including stationary shears and "flying" shears. Stationary shears require the strip of material to stop for an instant while the shear makes each cut. Stopping the strip for a cut generally reduces the throughput of the operation. Flying shears are designed to cut the strip as it moves. There are several types of flying shears including rocking shears, oscillating shears, and drum shears. Because the shear moves to match the strip speed, flying shears can make an accurate cut without requiring the strip to stop and restart each time. This continuous flow greatly increases the productivity of process lines that perform a shearing operation. However, flying shears also have limitations making them unsuitable for many shearing applications. The rocking shear is mounted on a pivot shaft below the material. The shear rocks forward and matches the speed of the material during the cut, then rocks backward to repeat the process. While the rocking shear is generally the least expensive of the flying shears, its changing vertical cut angle limits it to relatively lighter gauges and slow speeds. The oscillating shear works much like a conventional stationary shear, with an additional frame that moves the knife holder frame to match the strip speed resulting in a clean vertical cut. While the oscillating shear generally produces a superior cut, it is the most expensive system and the required acceleration of the heavy knife holder frame limits it to slower speeds than the drum shears.

In a drum system, the cutting knives are typically mounted on a pair of drums. As the material passes between the drums, the knives meet and shear the material in two. There are a variety of types of drum shears including parallel cut drums and helical cut drums. The parallel cut types have straight knives mounted parallel to the longitudinal axis of the drum. The parallel cut type drums are limited to the softer, lighter gauges due to the high force requirements necessary to make a simultaneous shear cut across the entire width of the material. The parallel cut rotary drum shears can provide good quality cutting at high speeds within these limitations.

The helical cut drum shears are generally not used for cut-to-length operations. With the helical cut drum shears, the knives are mounted along a helix angle on the drum. Accordingly, only one relatively small portion of the knife is shearing the material at one time as the drum rotates, resulting in significantly less force than typical parallel cut rotary drum shears. For example, a helical cut rotary drum having knives at a 5 degree helix angle may require only 10% of the cutting force required for a parallel cut. While this could reduce the equipment cost and provide significant savings for shearing applications, problems associated with the helical type drum shears make them generally unsuitable for cut-to-length operations. One such problem is that the knife cuts along a helix angle as the drums rotate, which creates an angled cut on the material. Cut-to-length operations typically require a squared cut perpendicular to the feed direction of the strip. Accordingly, the helical cutting drum shear is typically limited to scrap applications where angle of the cut is not important.

Accordingly, there exists a need in the art for a helical cutting type drum shear capable of providing a finish quality cut generally perpendicular or at a specific angle to the feed direction of the material.

SUMMARY OF THE INVENTION

The present invention overcomes at least one of the limitations of the prior art by providing an apparatus for cutting material moving at a first velocity. The apparatus comprises a means for cutting the material wherein the cutting means moves at a second velocity at a predetermined angle from the first velocity; and a means for moving the cutting means at a third velocity such that the combination of the second velocity and the third velocity is equivalent to the first velocity.

BRIEF DESCRIPTION OF THE DRAWINGS

The invention and developments thereof are described in more detail in the following by way of embodiments with reference to the drawings, in which.

DETAILED DESCRIPTION OF THE DRAWINGS

Figure 1A:
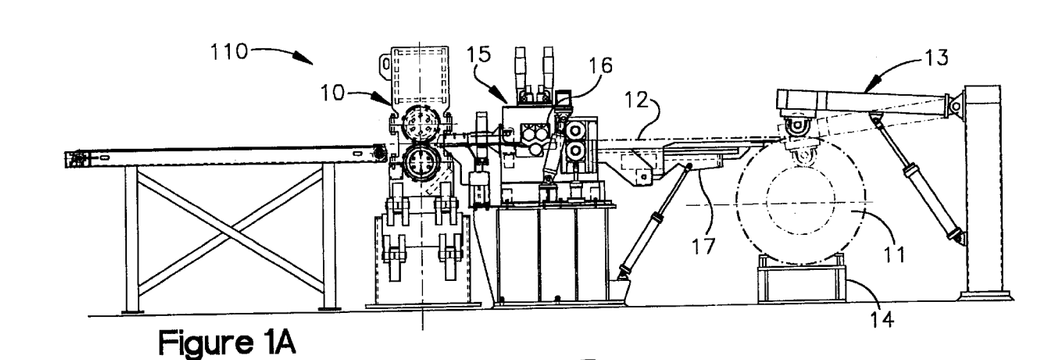
FIGS. 1A and 1B are an elevational view and a plan view, respectively, of a typical material processing line in which the helical rotary drum shears of the present invention might be used.
Figure 1B:
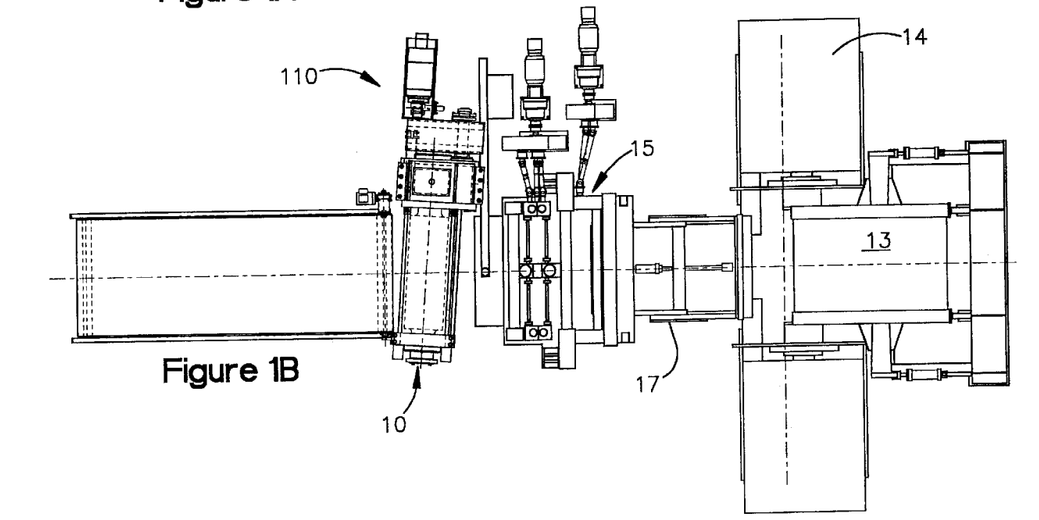

The following detailed description refers to different velocities. It is noted that a velocity is a vector having a magnitude component and a speed component, or in other words, a velocity is a speed in a particular direction. Referring now to FIGS. 1A and 1B, a typical cut-to-length material processing line 110 is shown utilizing the helical rotary drum shear system 10 of the present invention. It is noted that the processing line shown is intended as an example only and not to limit the present invention in any way. A coil 11 of strip material 12, typically a coil 11 of strip steel, is placed on an unwinder 14 that rotates the coil to provide a continuous strip of material 12. The strip material 12 is directed by the hold down roll 13 and the peeler 17 and fed into a flattener system 15 that typically utilizes multiple rollers 16 to flatten the strip material 12. Once flattened, the strip material 12 is fed into the helical rotary drum shear system 10, which cuts the strip 12 into predetermined lengths or at a predetermined location. The cut strips 12 continue down the line and are stacked or post processed as needed. It is noted that the material is not intended to be limited to steel. The invention is also suitable for other metallic and non-metallic materials such as paper, plastic, or the like.

Figure 2A:
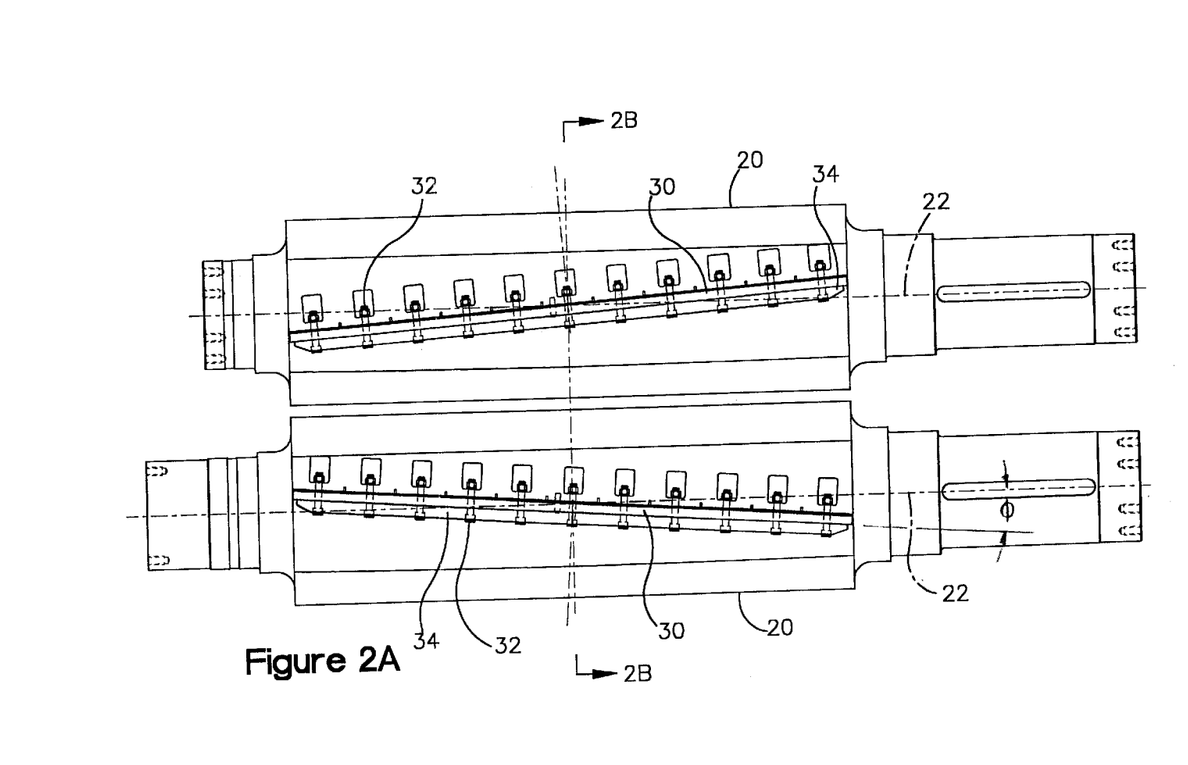
FIG. 2A is a side elevational view of an embodiment of the pair of rotary drums of the present invention each having a knife mounted thereon at a helix angle with respect to longitudinal axis of the drum and FIG. 2B is a cross-sectional view through the center of the pair of rotary drums of FIG. 2A.
Figure 2B:
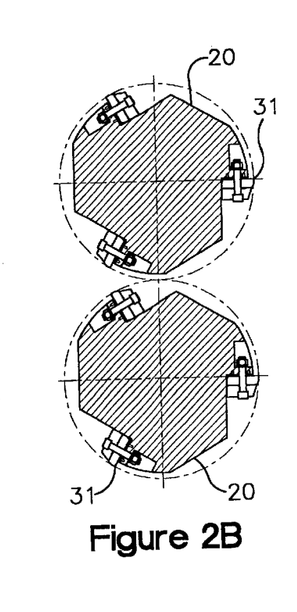

The helical rotary drum shear system 10 comprises a cutting means 20. The cutting means comprises a pair of drums 20 which are generally cylindrical and each have a longitudinal axis 22 about which they rotate, as best shown in FIGS. 2A and 2B. Each drum has at least one knife 30 mounted thereon by a fastening means 32 such as a plurality of fasteners 32, or any other suitable fastening or clamping mechanism to retain the knife 30 on the drum 20. It is also contemplated that the knives can be integrally formed with the drum. In another embodiment, the drum also includes a knife retainer 34 positioned overtop the knife to add support to the knife 30. Each knife 30 is mounted on the drum 20 at a predetermined helix angle φ with respect to the longitudinal axis 22 of the drum 20. The pair of drums 20 rotate in opposing directions and have knives 30 mounted in equal but opposite helix angles φ such that the drums 20 are complementary to each other. As the drums 20 rotate in opposite directions, the knives 30 will be in opposing shearing positions at one end of the drums 20. As the drums 20 rotate, the shearing position moves progressively from one end of knives 30 until it reaches the other end of the knives 30. As previously discussed, a cut made with a helically mounted knife 30 allows the total energy required to shear the material to be spread out over a period of time, whereas a typical parallel knife must exert this energy all at once. This is advantageous for at least two reasons. First, the nature of a helical cut results in only a portion of the total cutting force to be applied at any given time while cutting the material. Accordingly, the machine can be designed to withstand the smaller force requirement, which reduces the cost of the machine. Secondly, by spreading the force of cut over a longer period of time, the peak power (force per unit time) required to cut the material is reduced. This reduces the size of the motor and subsequently the cost of the drive system.

Figure 3:
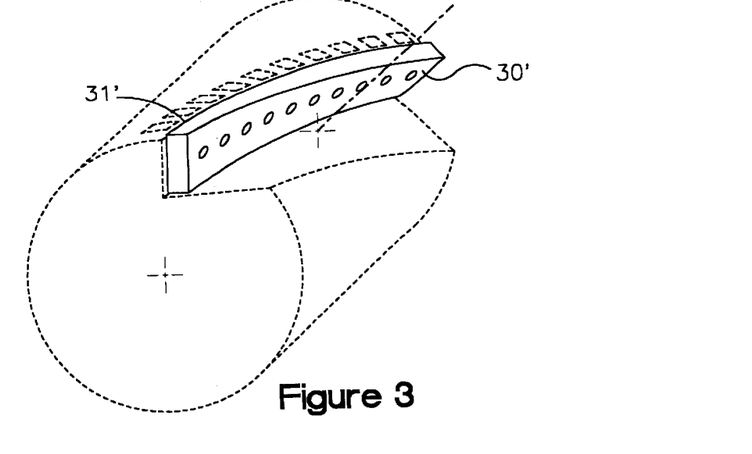
FIG. 3 is a perspective view of another embodiment showing a helical knife having a three dimensional cutting edge and positioned on a drum shown in phantom lines.

The knives 30 are mounted in a helical slot or positioned against a helical surface in the drums 20. It is noted that the knives 30 shown in FIGS. 2A and 2B have cutting edges 31 comprised of a straight two dimensional curve. In order to use a knife 30 with a two dimensional cutting edge 31 and not obtain a curved cut, the cutting edge 31 of the knife is made at least partially in the form of a radius and/or at least partially in the form of an ellipse. It is also contemplated that portions or all of the knife can be compound radii or ellipses or combinations thereof. To determine an example of such a profile, one may view the nature of the cutting required on a cylindrical surface and convert same to a two dimensional curve that would perform adequately similar to a true three dimensional helical blade without the time and expense of helical blade manufacture. One such a process is disclosed in co-owned U.S. Pat. No. 4,858,506, incorporated herein by reference. Helical knives 30' can also be used in the present invention as shown in FIG. 3. Truly helical knives 30' having a three dimensional cutting edge 31' can provide an accurate straight cut, however they are more expensive to manufacture and maintain. Helical knives 30' can either be formed helically or can be bent in a helical form. For most applications, depending on the tolerances required and the helix angle used, a two dimensional knife 30 will perform more than adequately and at a significant cost savings.

Figure 4:
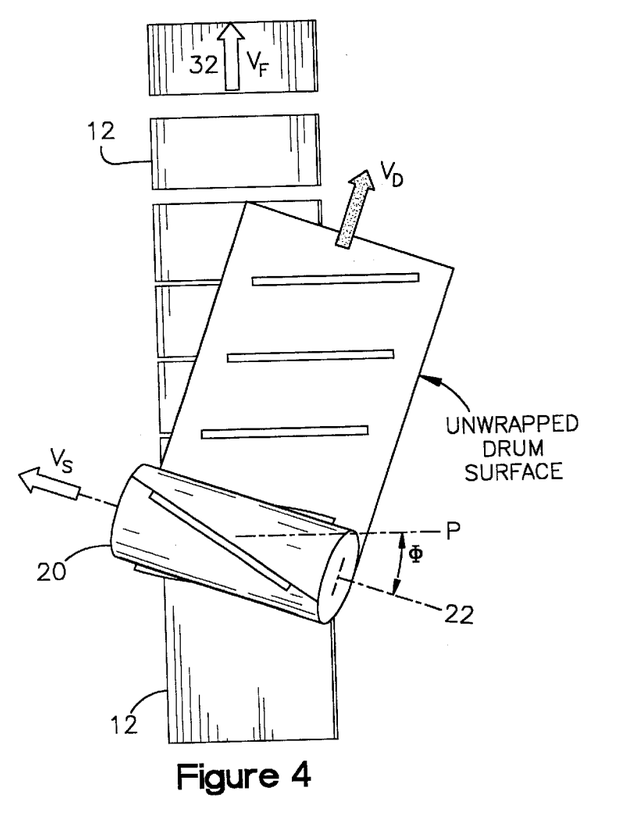
FIG. 4 is a top plan view of the rotary drums positioned at an angle with respect to the path of the strip of material to be cut by the shears and showing the conceptual unwrapping of the drum to show how a perpendicular cut is made.

As previously mentioned, prior art helical type drum shears typically produce a cut that is at an angle to a line P perpendicular to the feed direction of the material 12 to be cut which is equivalent to the helix angle of the knives. This is due to the physical relationship of the helical cut and the location of the longitudinal axis 22 of the drums 20 positioned on a line perpendicular to the feed direction of the material 12 to be cut. Referring now to FIG. 4, a top plan view of the helical drum cutting system 10 of the present invention is shown. The longitudinal axis 22 of the drums 20 is rotated at angle φ with respect to the line P perpendicular to a first velocity or feed velocity $V_F$ of the material 12 and is equivalent to the helix angle φ of the knife 30 mounted on the drum 20. FIG. 4 shows why the invention produces a cut that is generally perpendicular to the material feed velocity $V_F$ by conceptually unwrapping the surface of the drum 20 and overlaying it on the material 12.

Figure 5:
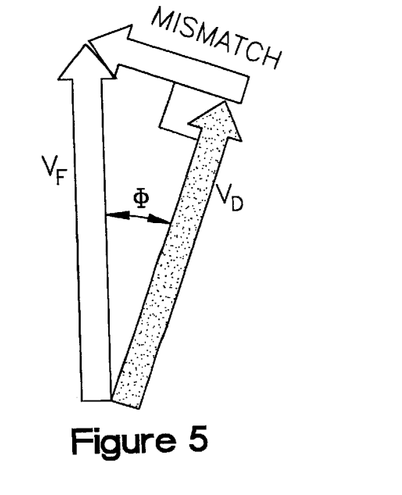
FIG. 5 is a trigonometric vector diagram showing the vector mismatch caused by the directional differences between the feed velocity and the drum's tangential velocity.

However, as shown in FIGS. 4 and 5, by trigonometrically showing the rotation of the drum's longitudinal axis 22 away from the line P perpendicular to the feed velocity $V_F$ of the material 12, results in a velocity vector mismatch of the drum tangential velocity $V_D$ to the material feed velocity $V_F$, by the helix angle φ. This mismatch component causes the knives to drag through the material 12. This drag results in a poor quality cut edge, premature wear on the knives and requires additional power from the driving system.

Figure 6A:
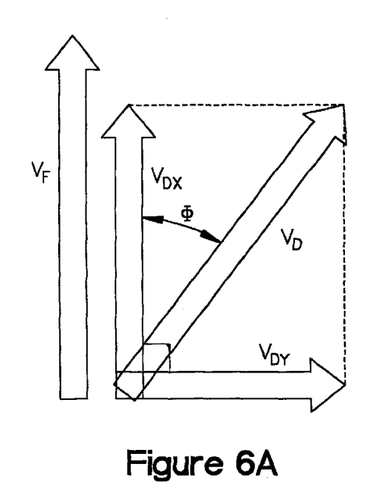
FIG. 6A is a vector comparison to show the drag on the knives by showing component velocities of the drum's tangential velocity and comparing them to the feed velocity of the material and FIG. 6B is a vector comparison to show the perpendicular drag on the knives when the parallel drag is compensated for by increasing the drum's tangential velocity.
Figure 6B:
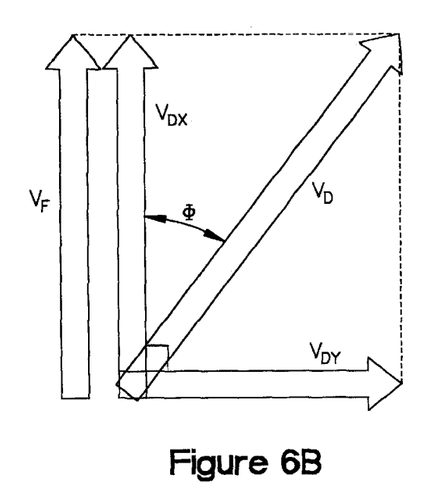

Referring now to FIG. 6A, the relationship between the mismatch and drag is discussed in greater detail. In order to better comprehend the drag caused by the differing velocity directions, the drum tangential velocity $V_D$ is broken down into its rectangular coordinate components, velocity $V_{DX}$ and $V_{DY}$ using the direction of the material velocity $V_F$ as the primary axis x. The magnitude, or speed, of the drum tangential velocity $V_D$ and of the material velocity $V_F$ are the same. However, breaking the drum tangential velocity $V_D$ into its vector components, we see two types of drag. The first drag is perpendicular to the material velocity $V_F$ and represented by velocity $V_{DY}$. This perpendicular drag $V_{DY}$ causes the knives to drag through the cut. The second drag is parallel to the material feed velocity $V_F$. The magnitude of the component velocity $V_{DX}$ is smaller than the material feed velocity $V_F$. This means that the knives are moving at a slower speed that the material in the same direction as the material and causes the knives to drag against the material in a direction opposite the material feed direction. Accordingly the second drag is represented by the difference between the component velocity $V_{DX}$ and the material feed velocity $V_F$. Referring now to FIG. 6B, it is possible to eliminate the second drag by increasing the drum tangential velocity $V_D$ such that the component velocity $V_{DX}$ is equivalent to the material feed velocity $V_F$. However, increasing the drum tangential velocity $V_D$ also will also increase the component velocity $V_{DY}$ thereby increasing the perpendicular drag.

In conventional helical drum shear arrangements where the longitudinal axis 22 of the drum 20 is mounted perpendicular to the material velocity $V_F$, the drum's tangential velocity $V_D$ direction and magnitude equals the direction and magnitude of the material velocity $V_F$ resulting in a smooth cut with no dragging of the knife through the material 12. However, the resulting cut is at an angle to the longitudinal axis of the material 12 equal to the helix angle.

Figure 7:
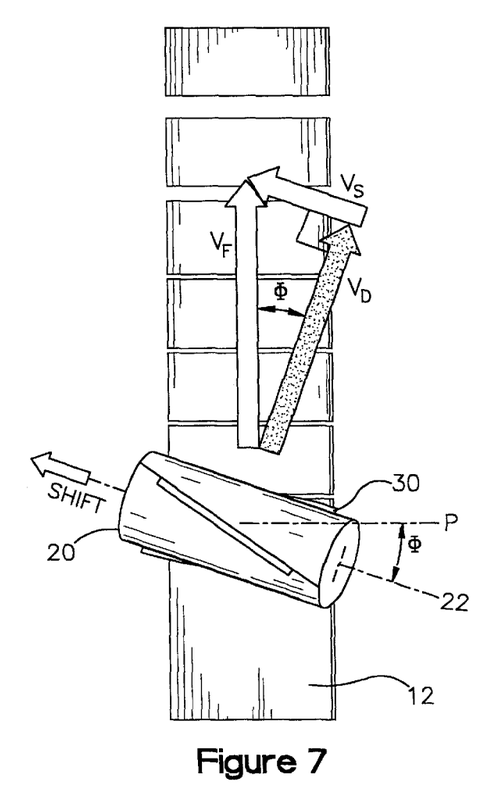
FIG. 7 is a top plan view of the rotary drums positioned at an angle with respect to the path of the strip of material wherein the drums are shifted along their longitudinal axis at a velocity and also showing a trigonometric vector diagram showing the vector addition of the drum's tangential velocity and the drum shifting velocity to be equivalent to the material feed velocity.
Figure 8:
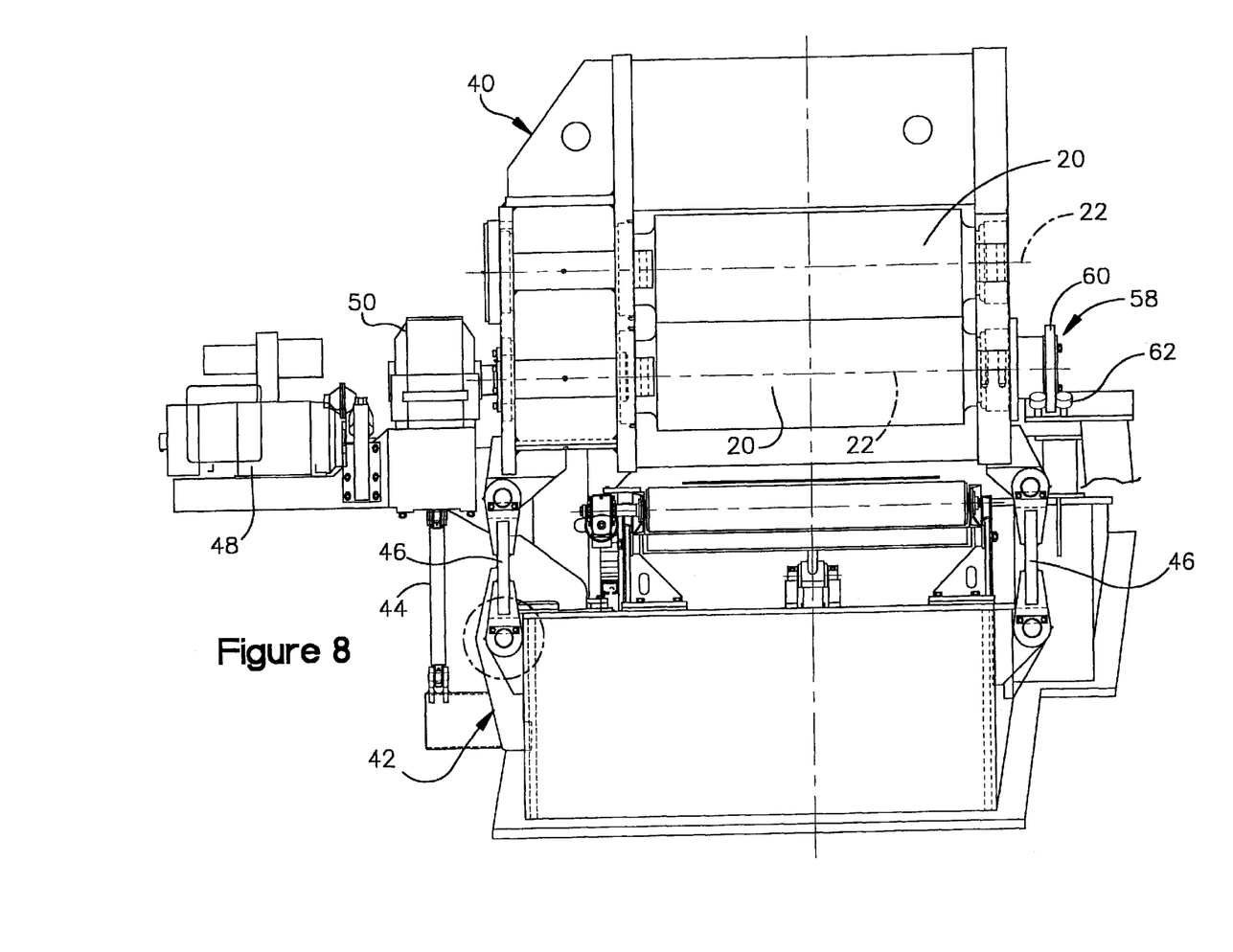
FIG. 8 is an elevational view of the pair of rotary drums mounted in a carriage with a power source and a lateral movement system and corresponding support members.

Referring now to FIG. 8, in order to overcome the mismatch problem causing the knives to drag through the cut, the helical drum shear system 10 of the present invention utilizes a means 58 to move or shift the drums 20 during the cut along the longitudinal axis 22 of the drums 20. This shifting of the drums results in a third velocity or drum shifting velocity $V_S$ which is equal to the mismatch velocity vector shown in FIG. 5. In FIG. 7, a vector summation analysis shows how the mismatch of the drum's tangential velocity $V_D$ to the material feed velocity $V_F$ is compensated for by adding the drum shifting velocity $V_S$. The combination of the drum's tangential velocity $V_D$ and the drum's shifting velocity $V_S$ is equivalent to the material feed velocity $V_F$. It is noted that in this embodiment, the drums 20 move along the drum axis. Accordingly the drums tangential velocity $V_D$ is equivalent to $V_F/\cos\phi$ and the drum's shifting velocity $V_S$ is equivalent to $V_F * \sin\phi$. As a result, the knives don't drag through the material.

Referring again to FIG. 8, an elevational view of the helical rotary drum shear system 10 is shown including the means 58 for moving the drums 20. In order to axially shift the drums 20 during the cut and back to its starting position between cuts, the drums 20 are mounted on a moveable carriage 40 moveably supported over a carriage base 42 by rotational link supports 46. In the embodiment shown, the drive motor 48 and associated speed reduction transmission gears 50 are also mounted on the carriage 40 order to simplify the power transmission arrangement. The reduced power requirement of the helical cut allows a relatively small motor to be used, which makes the mounting of the drive motor 48 on carriage 40 more economically feasible. The movement of the carriage 40 along the longitudinal axis 22 of the drums 20 can be accomplished by a variety of methods including pneumatic, hydraulic, electromechanical, mechanical, etc. The system chosen accurately controls the position and velocity to optimize the lateral movement of the carriage before, during, and after the cut. As previously mentioned, the shifting velocity $V_s$ of the lateral movement will be determined by the material feed velocity $V_F$ and the tangential velocity $V_D$ of the drum 20 (and the angle between the two component directions).

Figure 9A:
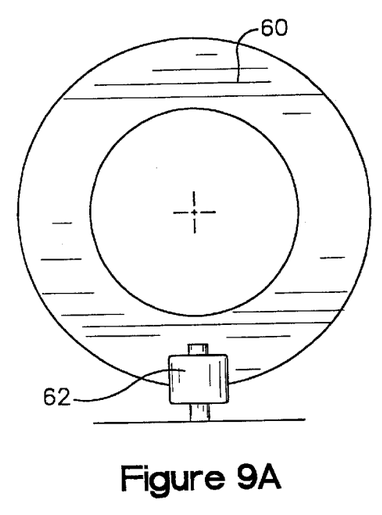
FIGS. 9A, 9B and 9C are an elevational view, a plan view, and a perspective view, respectively, of the wave cam of the present invention used in the lateral movement system associated with the pair of rotary drums as shown in FIG. 8.
Figure 9B:
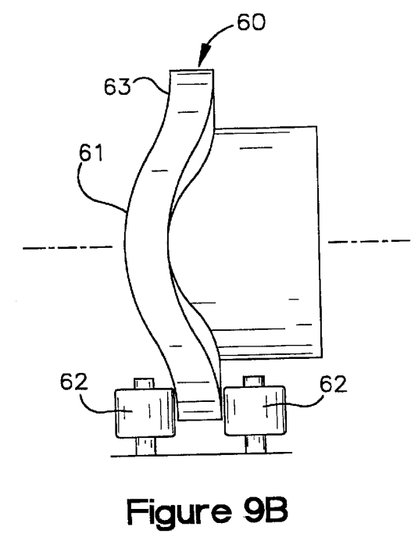
Figure 9C:
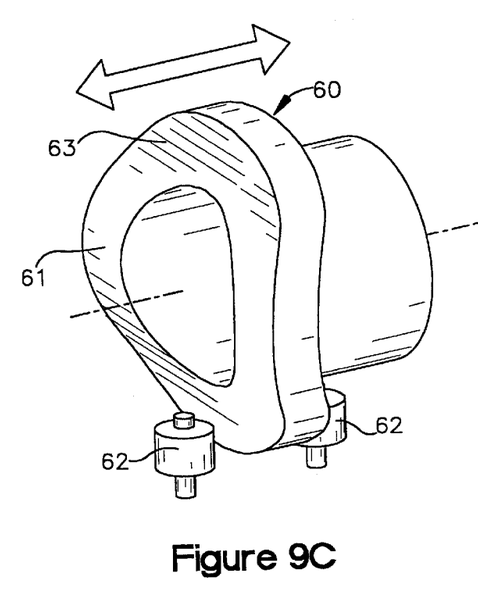

In the embodiment shown in the present invention, the means 58 for moving the drums 20 utilizes a mechanical system employing a wave cam 60 rotatably mounted on the longitudinal axis 22 of one of the drums 20. Referring now to FIGS. 9A–C, the wave cam surface has at least one wavelength having a crest 61 and trough 63. A pair of rotating cam followers 62 are positioned on opposite sides of wave cam 60. The cam followers 62 are fixably attached to the carriage base 42 as best shown in FIG. 8. As the wave cam 60 rotates between the cam followers 62, the cam followers 62 provide the force to control the lateral movement of the carriage 40. The crests 61 and troughs 63 represent the limits of lateral movement and generally correspond to the start of the cut cycle and the end of the cut cycle. Accordingly, the number of wavelengths will be equivalent to the number of knives 30 mounted on each drum 20.

Figure 10A:
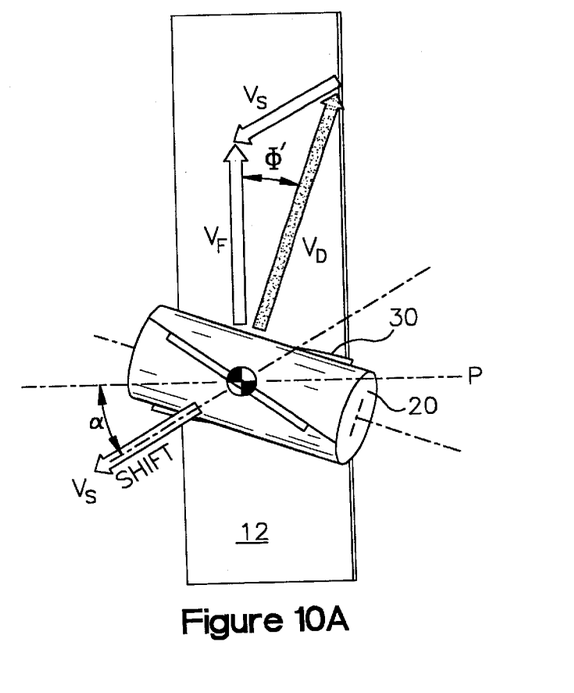
FIG. 10A is an top plan view of the rotary drums positioned at an angle with respect to the path of the strip of material wherein the drum is shifted at a velocity and also showing a trigonometric vector diagram showing the vector addition of the drum's tangential velocity and the drum shifting velocity to be equivalent to the material feed velocity.
Figure 10B:
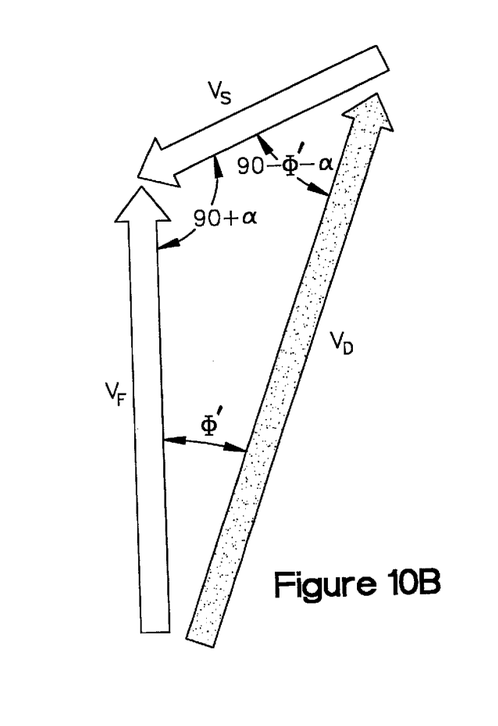
FIG. 10B shows the trigonometric vector diagram of FIG. 10A and the interrelationship of the angles.
Figure 10C:
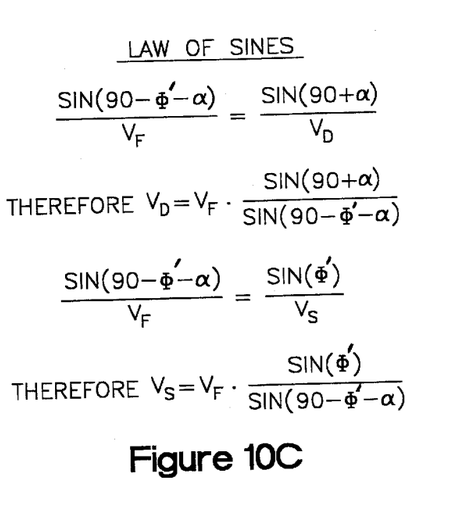
FIG. 10C shows the calculations of the drum's tangential velocity as a function of the material feed velocity and the calculation of the drum shifting velocity as a function of the material feed velocity.

In order to achieve a cut that is perpendicular to the material feed direction using a helical cutting type drum, the invention includes rotating the drums such that their longitudinal axis is not perpendicular to the material feed direction. The first embodiment of the drum shear system 10 compensated for the resulting directional mismatch of the drum's tangential velocity to the material feed velocity by shifting the drums along their longitudinal axis. In another embodiment of the present invention, the drum shear system 10 compensates for the resulting directional mismatch by moving the drums in a direction other than along their longitudinal axis. Referring now to FIGS. 10A–C, the drums 20 are shifted at a velocity $V_s$ along a line that is at an arbitrary angle $\alpha$ to the line perpendicular P to the material feed velocity $V_F$. The shift velocity $V_s$ will also compensate for the directional mismatch of the drum's tangential velocity $V_D$ to the material feed velocity $V_F$. Accordingly, in this drum shifting arrangement, the drum's tangential velocity $V_D$ will equal $V_F * [\sin(90+\alpha)]/[\sin(90-\phi'-\alpha)]$ and the drum shifting velocity $V_S$ will equal $V_F * [\sin(\phi')]/[\sin(90-\phi'-\alpha)]$.

The description thus far has demonstrated the invention to use helical style drum shears to produce cuts that are generally perpendicular to the material feed direction, resulting in material pieces that are rectangular in shape. However, there exist the need to accurately cut non-rectangular shapes such as parallelograms. While conventional helical drum shears can produce angled cuts that are equal to the helix angle of the knives, they are limited in the amount of helix angle they can use. The larger the helix angle, the more bending of the material occurs during the cut, which can permanently deform the material. Also, depending on the number of knives on the drums, the helix angle of each knife will be limited in order to prevent the knives from overlapping due to the physical construction of the drum. Therefore, the combination of the rotation angle away from the perpendicular to the material feed direction and the helix angle can be used in applications that require an angled cut that is greater than the results possible from a conventional helical drum shear.

It is also contemplated that the material feed velocity $V_F$ can be made to be equivalent to the drum's tangential velocity $V_D$ solely by moving the material and not the drum. Referring again to FIG. 6C, the material would be moved at a first velocity component equivalent to $V_{DX}$ and at a second velocity component equivalent to $V_{DY}$, such that effectively the material is moving at the same speed and direction as the drum's tangential velocity $V_D$.

As stated, a variety of materials, configurations, and applications can be employed in the practice of this invention. It is to be understood that such variations are intended to fall within the scope of the claimed invention and that the subject invention is not to be limited by the specific apparatus or method of operation described and/or depicted by the drawings nor is the invention to be limited by the specific materials and mechanical components identified and described herein. These have been designated merely to provide a demonstration of operability and the selection of mechanically equivalent arrangements is not deemed a departure from the spirit of the invention being limited solely by the scope of the attached claims.

What is claimed is:

1. An apparatus for cutting material moving at a first velocity comprising:
   a pair of drums rotating in opposite directions, each drum having a longitudinal axis positioned at a first angle from a line perpendicular to the first velocity while the material is being cut, such that a vector sum of the second velocity and the third velocity is substantially equal to a vector of the first velocity the first angle being an acute angle greater than zero;
   at least one cutting knife portion positioned on the periphery of each drum at a second angle to the longitudinal axis of the drum, the cutting knife portion of each drum positioned to helically shear the material when the pair of drums are rotating, the second angle being an acute angle greater than zero;
   wherein rotation of the drum causes each cutting knife to move with the drum at a second velocity tangential to the drum; and
   a means for moving the pair of drums at a third velocity while the material is being cut, the third velocity being transverse to the first velocity and the second velocity.

2. The apparatus of claim 1, wherein each cutting knife portion is positioned at a helix angle about the periphery of each drum.

3. The apparatus of claim 2, wherein the first and second angles are equivalent to the helix angle.

4. The apparatus of claim 1, wherein the pair of drums include a first drum and a second drum, wherein each cutting knife portion on the first drum is positioned at a helix angle and each cutting knife on the second drum is positioned at an equivalent helix angle in an opposite direction with respect to the longitudinal axis of the drum.

5. The apparatus of claim 1, wherein each knife portion has a two dimensional cutting edge.

6. The apparatus of claim 5, wherein the cutting edge is formed at least in part as a radius.

7. The apparatus of claim 1, wherein each knife portion has a three dimensional cutting edge.

8. The apparatus of claim 7, wherein each knife portion is a true helical knife when positioned on said drum.

9. The apparatus of claim 1, wherein the means for moving the cutting means comprises a mechanical structure.

10. The apparatus of claim 1, wherein the means for moving the cutting means comprises a wave cam.

11. An apparatus for cutting material moving at a feed velocity comprising:
    a pair of drums rotating in opposite directions;
    at least one cutting knife mounted on each drum and moving with the drum at a tangential velocity, wherein each cutting knife is associated with a cutting knife on the other drum and positioned to helically shear the material when the pair of drums are oppositely rotating;
    wherein the tangential velocity is at a first angle transverse to the feed velocity such that the material is sheared at a second angle substantially perpendicular to the feed velocity;
    wherein the pair of drums are moveable along their longitudinal axis at a lateral velocity at least during the shearing of the material and a vector sum of the tangential velocity and the lateral velocity is substantially equal to a vector of the feed velocity.

12. The apparatus of claim 11, wherein each knife has a two dimensional cutting edge.

13. The apparatus of claim 12, wherein the cutting edge is formed at least in part as a radius.

14. The apparatus of claim 11, wherein each knife has a three dimensional cutting edge.

15. The apparatus of claim 11, wherein each knife is a true helical knife edge when positioned on the drum.

16. The apparatus of claim 11, wherein the pair of drums are moved at a lateral velocity at least in part by a wave cam.

* * * * *

UNITED STATES PATENT AND TRADEMARK OFFICE
CERTIFICATE OF CORRECTION

PATENT NO. : 6,742,427 B2
DATED : June 1, 2004
INVENTOR(S) : Bura et al.

It is certified that error appears in the above-identified patent and that said Letters Patent is hereby corrected as shown below:

Column 7,
Line 19, replace "velocity" with -- velocity, --.
Lines 19-22, delete "while the material is being cut, such that a vector sum of the second velocity and the third velocity is substantially equal to a vector of the first velocity"
Lines 35-36, replace "the third velocity being transverse to the first velocity and the second velocity" with -- such that a vector sum of the second velocity and the third velocity is substantially equal to a vector of the first velocity --.

Signed and Sealed this

Twenty-seventh Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO.   : 6,742,427 B2
DATED        : June 1, 2004
INVENTOR(S)  : Buta et al.

It is certified that error appears in the above-identified patent and that said Letters Patent is hereby corrected as shown below:

<u>Column 7,</u>
Line 19, replace "velocity" with -- velocity, --.
Lines 19-22, delete "while the material is being cut, such that a vector sum of the second velocity and the third velocity is substantially equal to a vector of the first velocity"
Lines 35-36, replace "the third velocity being transverse to the first velocity and the second velocity" with -- such that a vector sum of the second velocity and the third velocity is substantially equal to a vector of the first velocity --.

This certificate supersedes Certificate of Correction issued July 27, 2004.

Signed and Sealed this

Twenty-eighth Day of September, 2004

JON W. DUDAS
*Director of the United States Patent and Trademark Office*